US008145367B2

(12) United States Patent
Khatwa et al.

(10) Patent No.: US 8,145,367 B2
(45) Date of Patent: Mar. 27, 2012

(54) CLOSED AIRPORT SURFACE ALERTING SYSTEM

(75) Inventors: Ratan Khatwa, Sammamish, WA (US); Jeff Lancaster, Plymouth, MN (US); James J. Corcoran, III, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 346 days.

(21) Appl. No.: 12/476,787

(22) Filed: Jun. 2, 2009

(65) Prior Publication Data

US 2011/0184635 A1 Jul. 28, 2011

Related U.S. Application Data

(60) Division of application No. 11/009,156, filed on Dec. 10, 2004, now Pat. No. 7,702,461, which is a division of application No. 10/440,461, filed on May 15, 2003, now Pat. No. 6,983,206, which is a continuation-in-part of application No. 09/800,175, filed on Mar. 6, 2001, now Pat. No. 6,606,563, application No. 12/476,787, which is a continuation-in-part of application No. 10/850,559, filed on May 19, 2004, now Pat. No. 7,587,278, which is a continuation-in-part of application No. 10/440,461, which is a continuation-in-part of application No. 09/800,175.

(60) Provisional application No. 60/381,029, filed on May 15, 2002, provisional application No. 60/381,040, filed on May 15, 2002, provisional application No. 60/472,063, filed on May 20, 2003.

(51) Int. Cl.
*G06F 19/00* (2006.01)

(52) U.S. Cl. ............... 701/16; 701/14; 701/15; 701/120

(58) Field of Classification Search ............. 701/14–16, 701/120
See application file for complete search history.

(56) References Cited

U.S. PATENT DOCUMENTS

| | | | |
|---|---|---|---|
| 3,808,598 | A | 4/1974 | Carter |
| 3,925,751 | A | 12/1975 | Bateman et al. |
| 4,128,839 | A | 12/1978 | McComas |
| 4,259,658 | A | 3/1981 | Basov et al. |
| 4,454,510 | A | 6/1984 | Crow |
| 4,646,244 | A | 2/1987 | Bateman et al. |
| 4,914,436 | A | 4/1990 | Bateman et al. |
| 4,979,137 | A | 12/1990 | Gerstenfeld et al. |
| 5,111,400 | A | 5/1992 | Yoder |
| 5,208,591 | A | 5/1993 | Ybarra et al. |

(Continued)

FOREIGN PATENT DOCUMENTS

DE 4304562 9/1993

(Continued)

OTHER PUBLICATIONS

E. Theunissed et al., Design and Evaluation of Taxi Navigation Displays, 2002 IEEE, 0-7803-7367-7/02, pp. 11.A.3-1 through 11.A.3-13.

(Continued)

*Primary Examiner* — Hussein A. Elchanti
(74) *Attorney, Agent, or Firm* — Lowe Graham Jones PLLC

(57) ABSTRACT

A system and a method alerts the occupant of an aircraft that the aircraft is in, or approaching, a zone of awareness associated with a closed surface at the airport.

22 Claims, 6 Drawing Sheets

U.S. PATENT DOCUMENTS 5,216,611 A 6/1993 McElreath
5,268,698 A 12/1993 Smith, Sr. et al.
5,289,185 A 2/1994 Ramier et al.
5,325,302 A 6/1994 Izidon et al.
5,343,395 A 8/1994 Watts
5,351,194 A 9/1994 Ross et al.
5,450,329 A 9/1995 Tanner
5,488,563 A 1/1996 Chazelle et al.
5,506,587 A 4/1996 Lans
5,519,392 A 5/1996 Oder et al.
5,519,618 A 5/1996 Kastner et al.
5,530,440 A 6/1996 Danzer et al.
5,548,515 A 8/1996 Pilley et al.
5,574,649 A 11/1996 Levy
5,596,332 A 1/1997 Coles et al.
5,608,391 A 3/1997 Bantli et al.
5,608,392 A 3/1997 Faivre et al.
5,627,546 A 5/1997 Crow
5,629,691 A * 5/1997 Jain ............................... 340/961
5,661,486 A 8/1997 Faivre et al.
5,695,157 A 12/1997 Coirier et al.
5,714,948 A 2/1998 Farmakis et al.
5,740,047 A 4/1998 Pilley et al.
5,839,080 A 11/1998 Muller et al.
5,872,526 A 2/1999 Tognazzini
5,892,462 A 4/1999 Tran
5,911,773 A 6/1999 Mutsuga et al.
6,018,698 A 1/2000 Nicosia et al.
6,038,502 A 3/2000 Sudo
6,043,758 A 3/2000 Snyder, Jr. et al.
6,061,628 A 5/2000 Hayashi et al.
6,076,042 A 6/2000 Tognazzini
6,088,634 A 7/2000 Muller et al.
6,112,141 A 8/2000 Briffe et al.
6,144,915 A 11/2000 Shiomi et al.
6,178,363 B1 1/2001 McIntyre et al.
6,182,005 B1 1/2001 Pilley et al.
6,192,314 B1 2/2001 Khavakh et al.
6,199,008 B1 3/2001 Aratow et al.
6,216,064 B1 4/2001 Johnson et al.
6,219,592 B1 4/2001 Muller et al.
6,219,618 B1 4/2001 Bateman
6,246,342 B1 6/2001 Vandevoorde et al.
6,253,150 B1 6/2001 Nakamura
6,259,378 B1 7/2001 Block
6,259,379 B1 7/2001 Paterson et al.
6,259,977 B1 7/2001 Mayer et al.
6,262,720 B1 7/2001 Jeffrey et al.
6,269,301 B1 7/2001 Deker
6,282,488 B1 8/2001 Castor et al.
6,298,296 B1 10/2001 Takahashi
6,304,800 B1 10/2001 Ishihara et al.
6,314,363 B1 11/2001 Pilley et al.
6,314,366 B1 11/2001 Farmakis et al.
6,317,663 B1 11/2001 Meunier et al.
6,345,233 B1 2/2002 Erick
6,347,263 B1 2/2002 Johnson et al.
6,351,709 B2 2/2002 King et al.
6,353,734 B1 3/2002 Wright et al.
6,370,475 B1 4/2002 Breed et al.
6,381,541 B1 4/2002 Sadler
6,405,975 B1 6/2002 Sankrithi et al.
6,438,491 B1 8/2002 Farmer
6,445,310 B1 9/2002 Bateman et al.
6,453,231 B1 9/2002 Ooga
6,462,697 B1 10/2002 Klamer et al.
6,487,501 B1 11/2002 Jeon
6,538,581 B2 3/2003 Cowie
6,591,170 B2 7/2003 Block et al.
6,591,171 B1 7/2003 Ammar et al.
6,600,977 B2 7/2003 Johnson et al.
6,606,563 B2 * 8/2003 Corcoran, III ................ 701/301
6,615,137 B2 9/2003 Lutter et al.
6,622,066 B2 9/2003 Ishihara et al.
6,657,578 B2 12/2003 Stayton et al.
6,683,541 B2 1/2004 Staggs et al.
6,690,295 B1 2/2004 De Boer
6,694,249 B1 2/2004 Anderson et al.
6,711,479 B1 3/2004 Staggs
6,748,325 B1 6/2004 Fujisaki
6,751,545 B2 6/2004 Walter
6,785,594 B1 8/2004 Bateman et al.
6,789,010 B2 * 9/2004 Walter .......................... 701/120
6,850,185 B1 2/2005 Woodell
6,862,519 B2 3/2005 Walter
6,865,477 B2 3/2005 Nicosia et al.
6,920,390 B2 7/2005 Mallet et al.
6,922,626 B2 7/2005 Ishiguro et al.
6,943,701 B2 9/2005 Zeineh
6,950,037 B1 9/2005 Clavier et al.
6,952,632 B2 10/2005 Robert et al.
6,980,892 B1 12/2005 Chen et al.
6,983,206 B2 1/2006 Conner et al.
7,034,841 B1 4/2006 Weiblen et al.
7,117,089 B2 10/2006 Khatwa et al.
7,126,534 B2 10/2006 Smith et al.
7,135,961 B1 11/2006 Operowsky et al.
7,813,845 B2 * 10/2010 Doose et al. .................... 701/16
2001/0013836 A1 8/2001 Cowie
2002/0089433 A1 7/2002 Bateman et al.
2002/0109612 A1 8/2002 Simon et al.
2002/0109625 A1 8/2002 Gouvary
2002/0116097 A1 8/2002 Block et al.
2002/0116127 A1 8/2002 Sadler
2002/0154061 A1 10/2002 Frazier, Jr. et al.
2002/0163461 A1 11/2002 Smithey
2002/0173888 A1 11/2002 Shelton et al.
2002/0173904 A1 11/2002 Dow
2003/0016159 A1 1/2003 Stayton et al.
2003/0033084 A1 2/2003 Corcoran, III
2003/0045994 A1 3/2003 Stratton et al.
2003/0090420 A1 5/2003 Pullen et al.
2003/0105580 A1 6/2003 Walter
2003/0107499 A1 6/2003 Lepere et al.
2003/0122701 A1 7/2003 Tran
2003/0135327 A1 7/2003 Levine et al.
2003/0137444 A1 7/2003 Stone et al.
2003/0160708 A1 8/2003 Knoop
2003/0171856 A1 9/2003 Wilf
2004/0006412 A1 1/2004 Doose et al.
2004/0026573 A1 2/2004 Andersson et al.
2004/0030465 A1 2/2004 Conner et al.
2004/0215372 A1 10/2004 Bateman et al.
2005/0015202 A1 1/2005 Poe et al.
2005/0090969 A1 * 4/2005 Siok et al. ..................... 701/120
2005/0104748 A1 5/2005 Block
2005/0190079 A1 9/2005 He
2005/0192739 A1 9/2005 Conner et al.
2005/0283281 A1 12/2005 Hartmann et al.
2006/0167598 A1 7/2006 Pennarola
2006/0265109 A1 11/2006 Canu-Chiesa et al.
2007/0241936 A1 10/2007 Arthur et al.
2007/0299597 A1 12/2007 Fetzmann et al.
2007/0299598 A1 12/2007 Fetzmann et al.
2008/0270020 A1 10/2008 Raab
2008/0306691 A1 12/2008 Louis et al.
2009/0018713 A1 1/2009 Coulmeau et al.
2009/0062972 A1 * 3/2009 Boorman et al. ................. 701/3

FOREIGN PATENT DOCUMENTS

DE 10011000 9/2001
EP 0674300 9/1995
EP 0744630 11/1996
EP 0756153 1/1997
EP 0565399 6/2009
JP 11175900 6/2009
WO 9705450 A1 2/1997
WO WO9747946 12/1997
WO WO9909429 2/1999
WO WO0016230 3/2000
WO WO0038131 6/2000
WO WO0057202 9/2000
WO 02/071367 A1 9/2002
WO WO03107299 12/2003

OTHER PUBLICATIONS

Dr. Jens Schiefele et al., World-Wide Precision Airport Mapping Databases for Aviation Applications, 2003 IEEE, 0-7803-7844-X/03, pp. 13.D.3-1 through 13.D.3-9.

Rick Cassell et al., Pathprox—A runway Incursion Alerting System, 2000 IEEE, AIAA 19th Annual Digital Avionics Systems Conference, pp. 1 through 6.

Denise R. Jones et al., Runway Incursion Prevention System—Demonstration and Testing at the Dallas/Forth Worth International Airport, Presented at the 20th Digital Avionics Systems Conference, Daytona Beach, Florida on Oct. 14-18, 2001, pp. 1 through 11.

Edward J. Zipser et al., The Vertical Profile of Radar Reflectivity of Convective Cells: A Strong Indicator of Storm Intensity and Lighting Probability?, 1994 American Meteorological Society, Department of Meteorology, Texas A&M University, College Station, TX 77843-3150, Aug. 1994, Monthly Weather Review, vol. 122, pp. 1751 through 1759.

Daryal Kuntman, Airborne System to Address Leading Cause of Injuries in Non-Fatal Airline Accidents, ICAO Journal, Mar. 2000, 55(2): 11-12, 27.

H. Dean Chamberlain, Runway Incursion is No Accident, FA Aviation News, From Cover to Cover, Feb. 2000, pp. 3 through 11.

Vincent Capezzuto, Runway Incursion Reduction Program (RIRP) Surveillance System, NASA/FAA Atlanta Demonstration, 1998 IEEE, 0-7803-5086-3/98, pp. F31-1 through F31-8.

* cited by examiner

CLOSED AIRPORT SURFACE ALERTING SYSTEM

PRIORITY CLAIM

This application is a Continuation-in-Part of U.S. application Ser. No. 11/009,156 (filed on Dec. 10, 2004, and published as U.S. Publication No. 2005/0128129), which is a Divisional of U.S. application Ser. No. 10/440,461 (filed on May 15, 2003, and now issued as U.S. Pat. No. 6,983,206), which is a Continuation-in-Part of U.S. application Ser. No. 09/800,175 (filed on Mar. 6, 2001, and now issued as U.S. Pat. No. 6,606,563). U.S. application Ser. No. 10/440,461 further claims priority to Provisional Application Ser. No. 60/381,029 (filed on May 15, 2002) and Provisional Application Ser. No. 60/381,040 (filed on May 15, 2002). Accordingly, the present application claims priority to and the benefit of the filing dates of U.S. application Ser. No. 11/009,156, U.S. application Ser. No. 10/440,461, U.S. application Ser. No. 09/800,175, Provisional Application Ser. No. 60/381,029, and Provisional Application Ser. No. 60/381,040, which are all incorporated by reference herein in their entirety.

Additionally, this application is a Continuation-in-Part of U.S. application Ser. No. 10/850,559 (filed on May 19, 2004, and published as U.S. Publication No. 2005/0015202), which is a Continuation-in-Part of U.S. application Ser. No. 10/440,461 (filed on May 15, 2003, and now issued as U.S. Pat. No. 6,983,206), which is a Continuation-in-Part of U.S. application Ser. No. 09/800,175 (filed on Mar. 6, 2001, and now issued as U.S. Pat. No. 6,606,563). U.S. application Ser. No. 10/440,461 further claims priority to Provisional Application Ser. No. 60/381,029 (filed on May 15, 2002), Provisional Application Ser. No. 60/381,040 (filed on May 15, 2002). Additionally, U.S. application Ser. No. 10/850,559 further claims priority to Provisional Application Ser. No. 60/472,063 (filed on May 20, 2003). Accordingly, the present application claims priority to and the benefit of the filing dates of U.S. application Ser. No. 10/850,559, U.S. application Ser. No. 10/440,461, U.S. application Ser. No. 09/800,175, Provisional Application Ser. No. 60/381,029, Provisional Application Ser. No. 60/381,040, and Provisional Application Ser. No. 60/472,063, which are all incorporated by reference herein in their entirety.

BACKGROUND OF THE INVENTION

On occasion, an aircraft may be approaching, entering onto, or in, a closed surface of an airport. Such closed surfaces at an airport may be inadvertently traversed by a landing aircraft or an on-the-ground aircraft. Non-limiting examples of surface areas are runways, gates, ramps, parking stands, taxiways, aprons, or de-icing areas. Surface areas may be closed because of some physical obstruction ('X' sign) or a surface issue (such as a milled surface being prepared for fresh concrete, or other construction or maintenance issue). In other situations, the on-the-ground aircraft may attempt to, or turn onto, a runway, taxiway or other surface for which the aircraft is not cleared to be on by the airport controllers. Here, the surface is not physically closed. Rather, the surface is closed to that particular aircraft. In other situations, an airborne aircraft may be attempting to land on a closed runway. For that particular aircraft, airport surfaces for which the aircraft is not cleared to operate is considered a closed surface.

Collisions between vehicles and other objects or other vehicles is a significant problem. Such collisions can frequently be traced to the vehicle inadvertently being driven or piloted into an area that the vehicle is not supposed to be in, at least at that time. The prior art has typically been to mark such areas and rely on the vigilance of the pilot or operator of the vehicle to observe the signage and to not drive the vehicle into the area. This system works most of the time; however, human operators are prone to human error, and the consequences of such collisions, particularly in certain applications, are so catastrophic that additional measures of preventing such accidents are warranted.

As an example, collisions between aircraft on the ground and other vehicles or aircraft are one significant source of accidents in the aircraft transportation system. One potential cause of a particularly catastrophic collision is an aircraft that is on the ground inadvertently taxiing onto a runway where another aircraft is landing or taking off. Another cause of collisions is an aircraft using the wrong runway. Various systems have been adopted in airports, in part to prevent or minimize such runway incursions. Traditional systems for this purpose include requiring permission from an air traffic controller before an aircraft taxis across a runway, watching and monitoring of the movement of aircraft by air traffic controllers, various signage and markings showing aircraft on the ground where to go, and use of aircraft lights while taxiing so that the aircraft can be seen better by air traffic controllers and pilots of other aircraft. However, the adoption of such systems have not eliminated the problem, and runway incursions have increased in recent years. In response to these increases, efforts have been undertaken to increase awareness and improve training of pilots, air traffic controllers, and others in a position to cause or prevent runway incursions. However, traditional technology is not a complete solution as it loses its effectiveness in poor visibility or poor weather conditions, and relies on the repeated and consistent avoidance of human error.

As a result, systems have been proposed, including the Airport Movement Area Safety System (AMASS) to monitor runways and alert air traffic controllers when an aircraft or other large object moves onto a runway. Such systems typically use Airport Surface Detection Equipment (ASDE) radar or other detection equipment to monitor the airport surface areas. Generally, when the system detects a runway incursion, the air traffic controller is alerted, who then must determine which aircraft or other object triggered the alarm, and notify the pilot of that aircraft (if the infringer is an aircraft) that they have traveled into an area where they should not be. Such systems are expensive, complicated, cumbersome, and difficult to use. Many detection systems are typically required for the perimeters of many runway safety areas, and air traffic controllers must either disable the system when an aircraft has clearance to cross a controlled parameter, or must deal with a false alarm each time such a crossing occurs. In addition, when an unauthorized incursion does occur, precious time is lost while the air traffic controller tries to figure out which aircraft (if it was an aircraft) triggered the detection equipment and notifies the pilot of the infraction. Furthermore, the use of different systems at different airports make the pilot's jobs more difficult and increase the likelihood of pilot error.

SUMMARY OF THE INVENTION

A system and a method alerts the occupant of an aircraft that the aircraft is in, or approaching, a zone of awareness associated with a closed surface at the airport.

BRIEF DESCRIPTION OF THE DRAWINGS

Preferred and alternative embodiments are described in detail below with reference to the following drawings.

Embodiments are illustrated by way of example and not limitation in the accompanying figures, in which like reference numerals indicate similar elements, and in which.

DETAILED DESCRIPTION OF THE INVENTION

Figure 1:
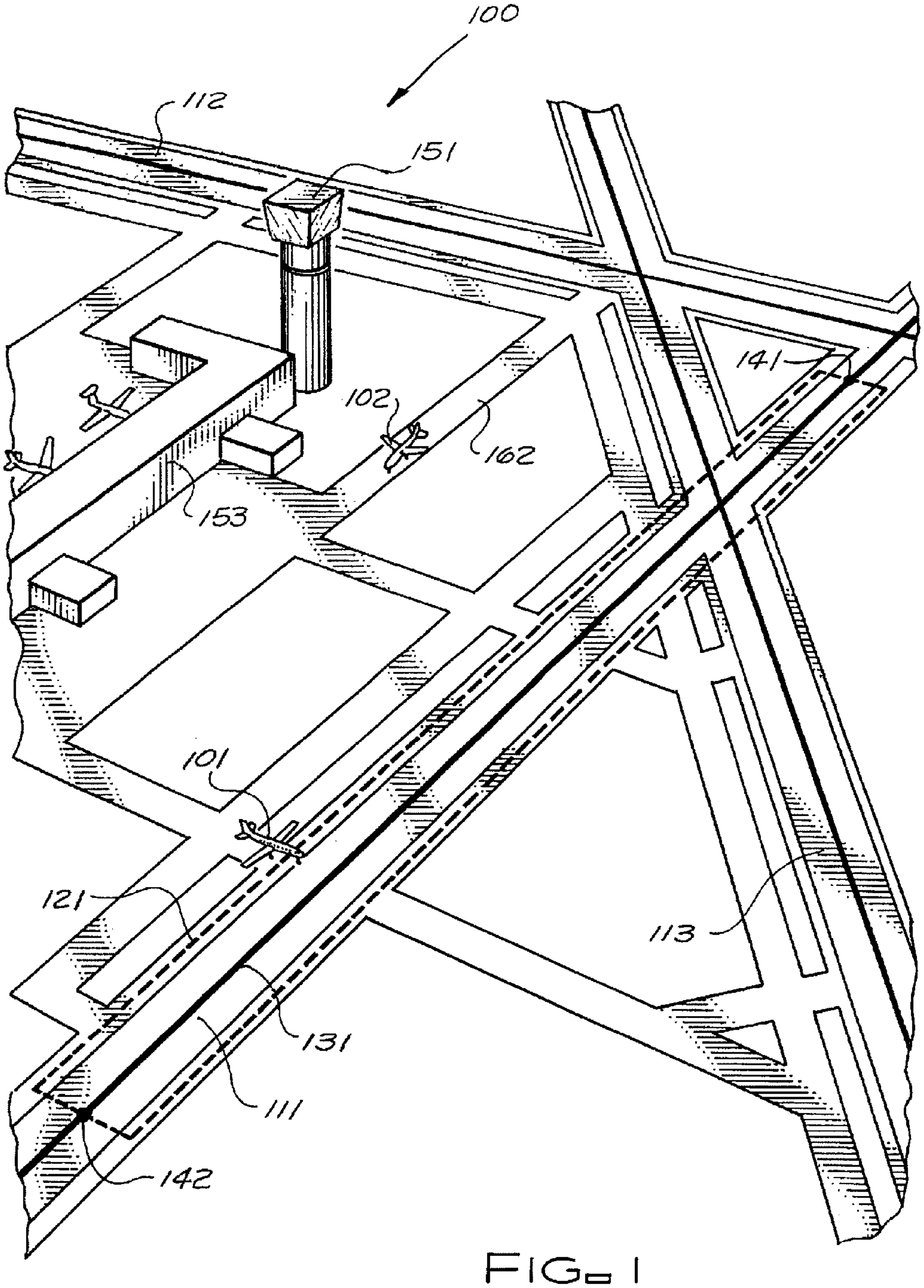
FIG. 1 is an isometric view of an airport with a zone of awareness depicted surrounding a runway, illustrating an exemplary embodiment of the present invention.

It is a feature of the present invention to provide a system to alert an operator or occupant of a vehicle that the vehicle is approaching or within a zone of awareness. In an exemplary embodiment, the present invention alerts the pilot or flight crew of an aircraft that is taxiing on the ground that the aircraft is approaching or on a runway, and in some embodiments, which particular runway. Accordingly, it is a feature of this invention to provide a method of reducing unintentional incursions of taxiing aircraft onto runways. Advantages of the present invention include that it is not necessary for all vehicles or aircraft to be equipped with the invention in order for it to work for the vehicles on which it is installed. Similarly, it is not necessary for all geographic areas to adopt the present invention in order for it to work. Therefore, it is not necessary for all vehicles or areas (such as airports) to convert to the system at the same time. Another advantage is that on many vehicles, some or all of the hardware required is already on the vehicles. Therefore, little or no additional hardware is required. Still another advantage is that the present invention is generally not reliant on external systems other than a positioning system such as a GPS. Even another feature of the present invention is that it is typically less expensive than other systems addressing the same problem, avoiding expensive surface equipment with associated maintenance and labor-intensive support.

In furtherance of these features, this invention provides an alerting system for alerting an occupant of a vehicle that the vehicle is approaching a zone of awareness. It may be, as an example, an alerting system for alerting the pilot or flight crew of an aircraft that the aircraft is approaching a zone of awareness surrounding a runway. The alerting system typically includes a database in a storage device located on the vehicle that is configured to store the location of the reference, a positioning system located on the vehicle that is configured to determine the vehicle location, a processor located on the vehicle that is configured to calculate the distance between the vehicle location and the location of the reference, and an alarm located on the vehicle that is configured to alert the occupant when the distance is less than a predetermined value. In other words, the processor is typically configured to calculate the distance between the zone of awareness and the aircraft and initiate the alerting device if the distance is within predetermined parameters.

The reference may be a line or line segment which may have two endpoints and may be defined by the coordinates of each end point. The coordinates may be longitude and latitude, and in some embodiments, the reference is the centerline of a runway and the vehicle is an aircraft. The positioning system may be a global positioning system (GPS), which may have an augmentation system. In some embodiments, there is also an enablement system configured to enable the alerting system when the aircraft is on the ground. The alarm may have an audible indication located on the vehicle, and may also have a silencing feature or system configured to allow the occupant to acknowledge and quiet or silence the audible indication. It may also have a reset feature configured to enable the audible indication after the aircraft exits the zone of awareness. The processor may be configured to rearm the audible indication after the vehicle has left the zone of awareness. The alarm may have a visual indication, which may have a designation of a feature within the zone of awareness such as a runway. The processor may be configured to take into consideration the velocity and direction of travel of the vehicle. It may do this by adjusting the predetermined value, the vehicle location, the location of the reference, or the distance between the vehicle location and the location of the reference. The system may store location coordinate information for substantially all runways at least 3000 feet long that the aircraft is authorized to use.

This invention further provides an alerting system for alerting the pilot or flight crew of an aircraft that the aircraft is within a zone of awareness. The system may have a database on the aircraft containing location coordinate information for a plurality of zones of awareness, a positioning system configured to determine the location coordinates of the aircraft, a display device on the aircraft configured to display the indication to the pilot or flight crew, and a processor on the aircraft configured to determine whether the aircraft is within a zone of awareness and initiate an indication identifying a zone of awareness the aircraft is within. The location coordinate information for each zone of awareness may be essentially a line. The positioning system may be a GPS, which may have an augmentation system. The predetermined value may be between 100 and 200 feet, and may be approximately 150 feet. In some embodiments, the plurality of runways may include substantially all runways at least 3000 feet long that the aircraft is authorized to land at. In other embodiments, any length of runway, or airport surface, may be defined by a zone of awareness. The indication may be a runway designation. There may be an audible alarm, which may include a voice warning.

This invention even further provides a method of reducing unintentional incursions of taxiing aircraft onto runways. The aircraft typically have a control system and a pilot or flight crew, and the method typically has the steps of storing within the control system the position of a plurality of runways, repeatedly determining the position of the aircraft, calculating the distance between the aircraft and at least one runway, and alerting the pilot or flight crew if the distance is within predetermined parameters. The method may also include the steps of repeatedly determining the velocity of the aircraft, repeatedly determining the heading of the aircraft, and adjusting the predetermined parameters or the position of the aircraft based on the velocity and heading of the aircraft. It may have the step of determining whether the aircraft is on the ground. The alerting may have an audible alarm, and the method may also have the step of the pilot or flight crew manually acknowledging and quieting the alarm. The method may also have the step of re-enabling a quieted alarm when or after the distance between the aircraft and the runway exceeds a predetermined value. The method may also have the step of providing to the pilot or flight crew the designation of the runway that the aircraft is on or near. After the alerting, the pilot or flight crew may contact an air traffic controller for instructions.

The various embodiments of the present invention may include the vehicle that the system is mounted on. The vehicle may be, in some embodiments, an aircraft The present invention provides a system and method for alerting the occupant of a vehicle that the vehicle is in or approaching a zone of awareness. For instance, as illustrated in FIG. 1, the system may be used to alert the pilot or flight crew of aircraft 101 that aircraft 101 is on or approaching runway 111, and may identify the specific runway 111. Thus, an exemplary embodiment of which is illustrated in FIG. 3, the invention also provides a method of reducing unintentional incursions of aircraft (e.g. taxiing aircraft such as aircraft 101 and 102 shown in FIG. 1) onto runways. As conceptually illustrated in FIG. 2, the system 201 generally includes a storage device or memory, for example storage database 202, a positioning system 205 that may be a GPS or similar system, an alerting device such as an alarm 217 or display 220, and a processor 211, all of which are typically located on the vehicle (e.g. on aircraft 101 of FIG. 1).

As an overview, positioning system 205 typically repeatedly determines the location of the vehicle. The processor 211 typically compares the location of the vehicle (e.g. aircraft 101 on FIG. 1) with stored location information for various zones of awareness (e.g. zone of awareness 121 on FIG. 1) and initiates an alert when appropriate. The processor 211 may take into consideration the velocity and direction of travel of the vehicle (e.g. of aircraft 101 on FIG. 1). Referring to FIG. 1, zones of awareness (e.g. 121) may be defined by coordinates, such as the end points of line segments (e.g. points 141 and 142 defining the endpoints of centerline 131 of runway 111). Audible alarms (e.g. 217 on FIG. 2) may include a voice warning, and may be able to be silenced until the vehicle (e.g. aircraft 101 on FIG. 1) leaves the zone of awareness (e.g. zone of awareness 121 on FIG. 1). On aircraft (e.g. aircraft 101 on FIG. 1), the system may reference a positional line of awareness such as the centerline of the runway, for example on FIG. 1, alerting when aircraft 101 is within 150 feet of centerline 131. The system may be disabled when the aircraft is in flight.

An alerting system according to the present invention may be a system installed on a vehicle, or may include the vehicle itself. In either case, the present invention may require additional hardware, or may be constructed, all or in part, using hardware already installed on the vehicle, e.g. for other purposes. In some embodiments, such as illustrated in FIG. 1, the vehicle is an aircraft (e.g. 101), and the occupants are the pilot or flight crew of the aircraft. However, the vehicle may be another type of vehicle such as a luggage vehicle, a fuel vehicle, a maintenance vehicle, a moveable stairway, an emergency vehicle, or any other vehicle found at an airport (e.g. airport 100). In addition, in other embodiments the vehicle may be found at another location, and may be an automobile, a surface ship or boat, a submarine, a train or locomotive, a spacecraft, a golf cart, a construction vehicle, a snow mobile, a man lift, or generally any other vehicle configured to carry at least one person.

Figure 2:
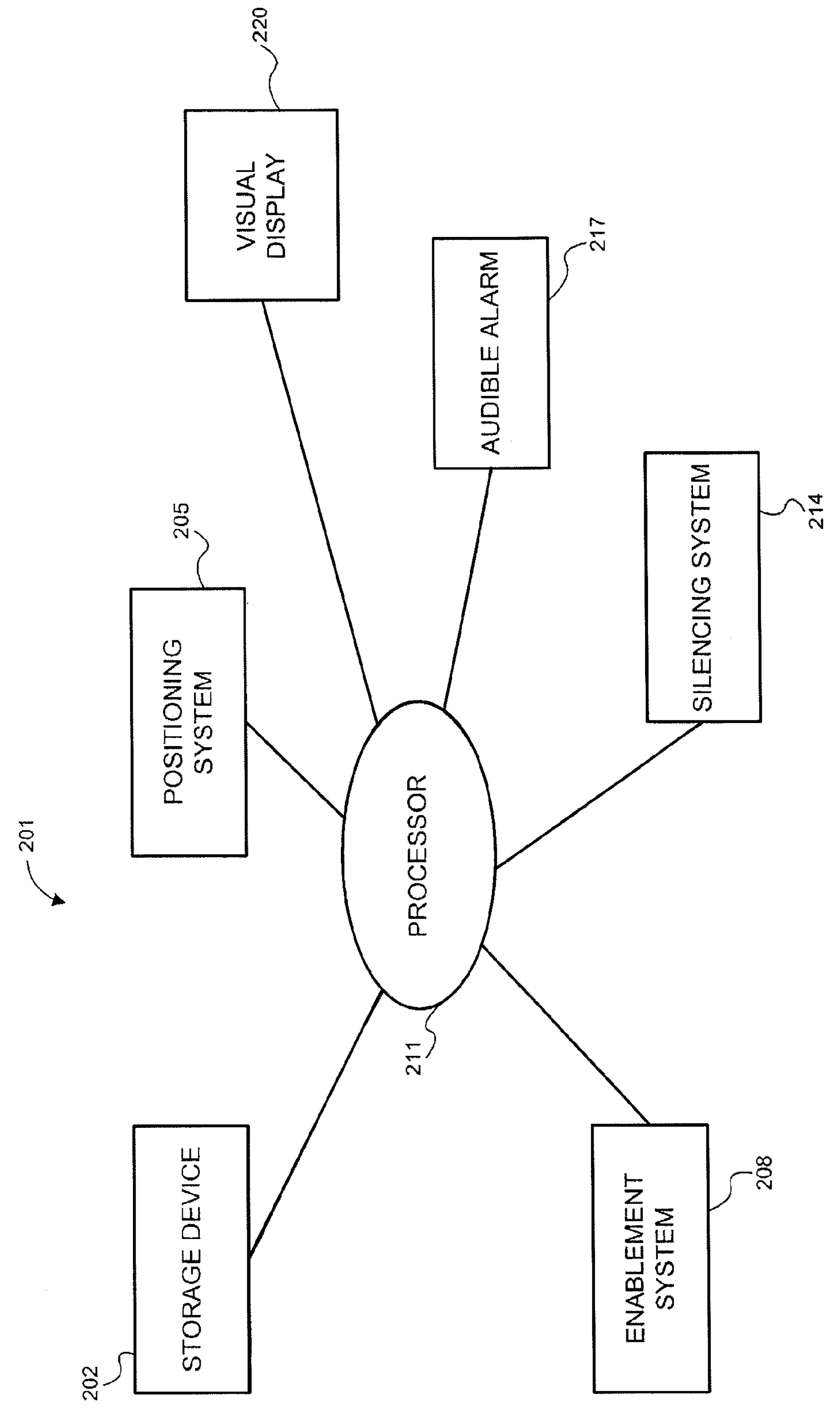
FIG. 2 is a block diagram illustrating conceptually assorted components of various embodiments of the present invention.
Figure 3:
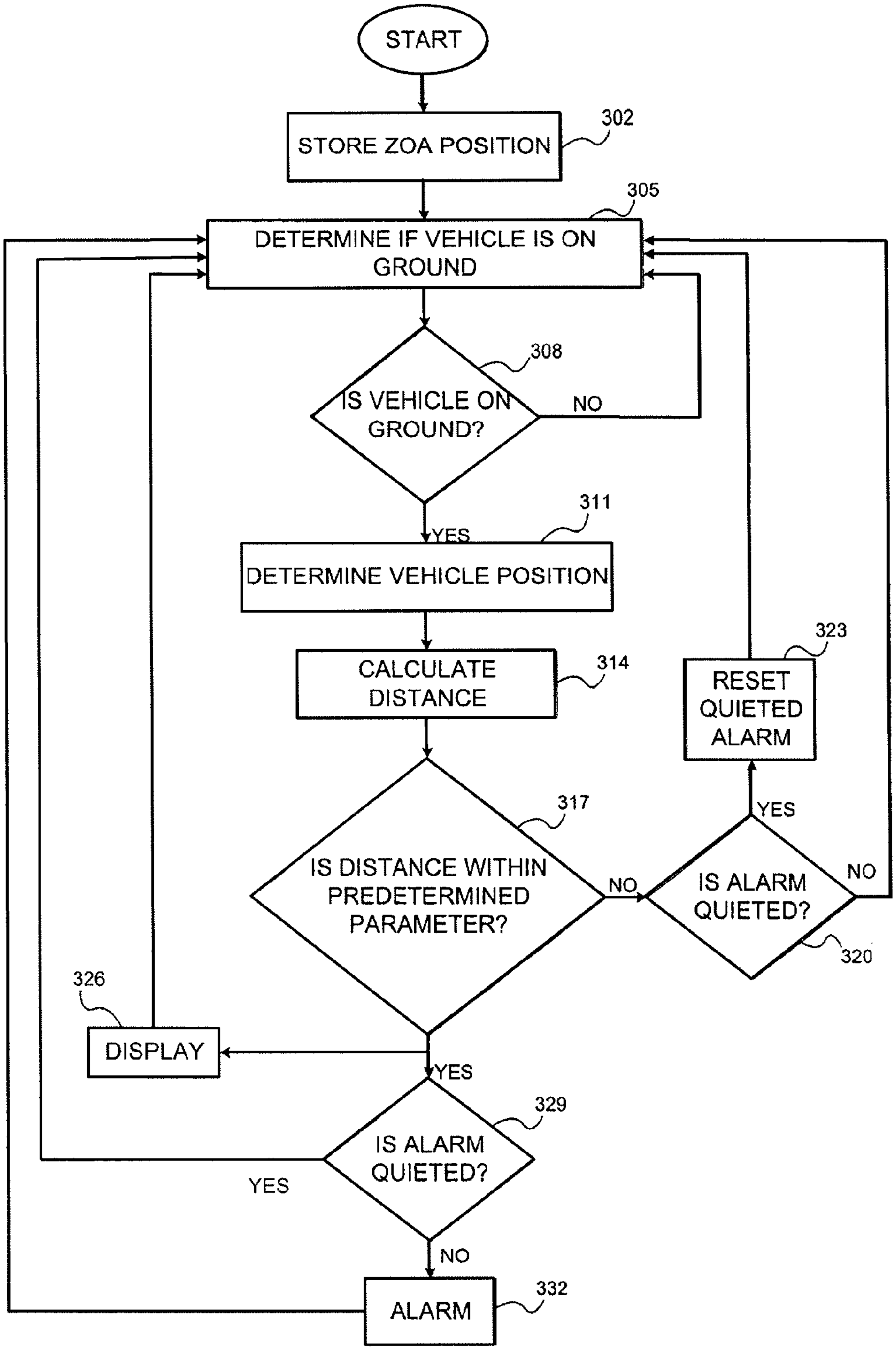
FIG. 3 is a flow chart illustrating steps of methods according to various embodiments of the present invention.

Referring to FIG. 2, an alerting system 201 according to the present invention is typically for alerting an occupant of a vehicle that the vehicle is in a zone of awareness, or approaching a zone of awareness. In many embodiments, the system alerts under both conditions. Alerting system 201 typically includes a storage device 202, a positioning system 205, an alerting device such as alarm 217 or display 220, and a processor 211. Although described herein as being separate systems or components, as would be understood by a person skilled in the art, conceptual components described herein of these and other systems may be combined in the same equipment or may be part of other systems or equipment otherwise unrelated to the present invention.

Storage device 202 is typically located on the vehicle and is configured to store a database containing location information for a plurality of zones of awareness. Storage device 202 may be, as an example, computer memory such as random access memory (RAM), read-only memory (ROM), such as a compact disk (CD) ROM, or erasable programmable read-only memory (EPROM). Storage device 202 may be used for other purposes besides the present invention, or may be dedicated to the present invention. In embodiments where the vehicle is an aircraft, storage device 202 may comprise or be part of the Flight Management System (FMS) Navigational Database, a Runway Awareness and Advisory System (RAAS), a Taxiway Awareness and Advisory System (TAAS), Enhanced Traffic Situation Awareness on the Airport Surface with Indications and Alerts (ATSA SURF IA), or other aircraft situational awareness systems.

A zone of awareness as used herein is generally an area or geographic region of particular interest or hazard. For instance, as illustrated in FIG. 1, zone of awareness 121 is the area of runway 111 where aircraft may be moving at a high rate of speed when they are landing or taking off. There may be many zones of awareness, e.g. one for each runway that the aircraft is authorized to use. For a commercial airliner, this may include all runways in the world that are at least 3000 feet long, typically just hard surfaced runways. There may be exceptions that the aircraft is not authorized to use, such as military airfields, or airfields in countries that are hostile to the country from which the aircraft originates. On the other hand, even these exceptions would be of interest to the pilots and flight crew of aircraft that use them, and may be included in the database.

The location information stored on storage device 202 may include the location of a reference from which the zone of awareness is defined. For instance, the reference may be a line or line segment, and the location information may be the coordinates of the endpoints of line segments. The coordinates may be relative to the surface of the earth, and may be longitude and latitude. Referring to FIG. 1, as an example, storage device 202 may contain location information for a plurality of runways, for example runways 111, 112, 113, at airport 100, and other runways at other airports not shown on the figures. The centerline of each runway, for example centerline 131 of runway 111, may be references or positional lines of awareness, which may be defined by the coordinates of the endpoints, for example points 141 and 142 of runway 111. Thus, storage device 202 may need only store the coordinates of endpoints 141 and 142 for centerline 131 of runway 111. Processor 211 on aircraft 101 would then initiate an alert if the distance between aircraft 101 and the line segment between points 141 and 142 (e.g. centerline 131) fell below the predetermined parameters, for example, below 150 feet. The database in storage device 202 containing the location information for various zones of awareness may need to be updated periodically as conditions change, e.g. as new runways and airports are opened and old runways and airports are closed either temporarily or permanently. For instance, the database in storage device 202 may be updated every 28 days.

As illustrated in FIG. 1, zones of awareness around runways may be rectangular, for example, typically over 3000 feet long and about 300 feet wide. Alternatively, a zone of awareness may encompass only part of a runway, for instance, the part where taxiways abut the runway. In such an embodiment, the zone of awareness may be considerably shorter. The ends may be square as shown, or may be half circles (i.e. all of the area within a fixed distance of either the end points (141 and 142) or the line segment in between. Zones of awareness may have other shapes, particularly in embodiments where the feature within is an area, such as a hazardous area, other than a runway. Other shape zones of awareness may have other shaped references such as points, polygons, curves, and the like. In many embodiments, zones of awareness are particular geographic areas on the surface of the earth. However, zones of awareness in accordance with the present invention may be defined relative to other references or coordinate systems provided the positioning system (e.g. 205, described in detail next) is capable of providing information relative to those references or coordinate systems, or that can be converted to such.

Zones of awareness identify and/or define a closed airport surface. Thus, there may be zones of awareness for runways, gates, parking stands, ramps, taxiways, aprons, or de-icing areas. Zones of awareness may be used to identify and/or define surfaces that the on-the-ground aircraft may attempt to enter, or turn onto, for which the aircraft is not cleared to be on by the airport controllers. Such surfaces are not physically closed, but are closed to that particular aircraft. Further, zones of awareness may identify and/or define closed runways, or not cleared runways, that an airborne aircraft on final approach may be attempting to land on.

Positioning system 205 is typically also located on the vehicle, and is typically configured to determine the vehicle location. Positioning system 205 may be a global positioning system (GPS), for instance, which uses signals from satellites in orbit around the earth to determine the location of the vehicle. Where greater accuracy is desired than is offered by a typical GPS, positioning system 205 may also have an augmentation system. Either a wide area augmentation system (WAAS) or a local area augmentation system (LAAS) may be used. An augmentation system may, for example, include an additional reference point located near the zone of awareness, and would typically improve the accuracy of positioning system 205. The positioning system 205 could also be an internal reference system (IRS), a laser ring gyroscopic system, or other system e.g. that determines its position relative to the magnetic sphere of the earth. Positioning system 205 could use a composition position from several sources such as an FMS position, for example utilizing some combination of GPS, IRS and VOR/DME information. Greater precision resulting from more sophisticated positioning systems will typically result in fewer false alerts, fewer missed alerts, or both, making the alerting system 201 more effective and more reliable.

Processor 211 is also typically located on the vehicle, and is typically configured to provide controlling input to the alerting device (217 or 220) based on the vehicle location and the location information e.g. of the zones of awareness stored in storage device 202. In other words, processor 211 figures out when to alert, and tells the alerting device when to alert, and in some embodiments, what information to present. Thus, processor 211 initiates the alerting device. Processor 211 may be a computer or computer processor, typically capable of performing operations and manipulating data. Thus, as illustrated in FIG. 2, processor 211 receives information form storage device 202, positioning system 205, and in some embodiments other systems, some of which are described below, and from this information determines whether the vehicle is in or approaching a zone of awareness. If it is, and various prerequisite conditions are met, then processor 211 alerts or notifies the occupants of the vehicle, such as the driver or pilot, typically either via alarm 217, display 220, or both. In other words, processor 211 is configured to initiate, or provide controlling input to, the alerting device, based on the vehicle location and the location information in storage device 202. Processor 211 may have other responsibilities or be part of another system such as, for example, a navigation computer, a control system, or a flight management system (FMS) or EGPWS on an aircraft. Processor 211 may be programmed in a computer language such as C++, typically in ways familiar to a person skilled in the art of programming.

For example, processor 211 may be programmed or configured to calculate the distance between the vehicle location and the location information from storage device 202 and initiate the alerting device (e.g. 217 or 220) if the distance is within predetermined parameters. In other words, processor 211 may calculate the distance between the vehicle and the reference, and initiate an alert if appropriate. The predetermined parameters may be a fixed distance between the vehicle and the zone of awareness, or between the vehicle and a reference defining or within the zone of awareness. For instance, processor 211 may initiate an alert whenever the distance between the vehicle and a reference is less than or equal to a fixed value. This fixed value may be, for example, between 100 and 200 feet. Fixed values within such a range will typically work well for embodiments such as shown in FIG. 1 where the vehicle is aircraft 101 and the reference is the centerline 131 of runway 111. For example, the fixed value or distance below which an alert is initiated may be 150 feet.

In more complex embodiments, processor 211 may be configured to take into consideration the motion of the vehicle. Processor 211 may, for example, adjust the predetermined parameters according to the velocity or direction of travel (or both) of the vehicle. For instance, processor 211 may increase the fixed distance at which an alert is initiated if the vehicle is approaching the zone of awareness. The amount of increase, for instance, may be proportional, or otherwise related to, the speed at which the vehicle is approaching the zone of awareness. Alternatively, processor 211 may adjust the values it is using for the vehicle location, the location of the reference, or the distance between the vehicle location and the location of the reference, according to the velocity, direction of travel, or both, of the vehicle. Processor 211 may also be configured to take into consideration the shape of the vehicle, the size of the vehicle, where the positioning system is located on the vehicle, or some combination thereof.

The alerting device may be an audible alarm 217 or a visual display 220. The alerting device, such as alarm 217 or display 220 (or both) is also typically located on the vehicle, and is generally configured to alert the occupant, for example, that the vehicle is within, or close to, a zone of awareness. An aural or audible alarm 217, which would typically be located in the vehicle, may be a buzzer, chime, bell, horn, speaker, or other device capable of making a sound. In some embodiments, audible alarm 217 produces a synthesized voice warning. For instance, in the embodiment illustrated in FIG. 1, alarm 217 may produce a voice warning such as "RUNWAY", "RUNWAY", "RUNWAY" . . . which may be repeated continuously as long as the vehicle is within the zone of awareness. As controlled by processor 211, alarm 217 may also indicate where the zone of awareness is relative to the vehicle, for example, "RUNWAY AHEAD" or "RUNWAY ON THE RIGHT".

Alternatively, or in addition, a voice warning from alarm 217 may include the designation of the zone of awareness or of a feature within the zone of awareness. Where applicable, such as regarding an aircraft on a runway, the designation may include or indicate the direction that the vehicle is going. In embodiments involving aircraft or airports, the designation used is preferably similar or identical to the designation used in communications with the air traffic controllers. For instance, in the embodiment illustrated in FIG. 1, the feature may be runway 111, which may be designated as Runway 27, and alarm 217 (e.g. on aircraft 101) may produce a voice warning such as "ENTERING RUNWAY 27", "ENTERING RUNWAY 27", "ENTERING RUNWAY 27" . . . which may repeat continuously. In this example, "27" indicates the direction that an aircraft traveling on the runway is headed, i.e. 270 degrees from North (West). Thus, an aircraft traveling the opposite direction (East) on the same tarmac may be said to be on "RUNWAY 9". Thus, such an embodiment would alert the pilot or flight crew not only to which runway they are on, but also as to which direction they are headed. A further designation, such as a letter, may be added where there are more than one runway in the same direction.

It may be distracting or annoying to the occupant of the vehicle for audible alarm 217 to alert continuously as long as the vehicle is within the zone of awareness. Therefore, alerting system 201 may also have a silencing system 214 (shown on FIG. 2) configured to allow the occupant to acknowledge and quiet or silence audible alarm 217. Typically, the operator will quiet alarm 217 manually via a button such as a push-button yolk mounted switch or annunciator warning capsule push button, a pickle switch, or through a spoken order and a voice recognition system. As would be apparent to a person of ordinary skill in the art, silencing system 214 may interface with processor 211 as shown in FIG. 2, or may interface directly with alarm 217. In such a system, processor 211 may be configured to rearm audible alarm 217 when the vehicle is no longer in the zone of awareness. Thus, alarm 217 will activate if the vehicle leaves the zone of awareness and reenters it or enters another zone of awareness. Where zones of awareness overlap, such as runways 111 and 113 in FIG. 1, alarm 217 may be configured to alert if the vehicle enters a second zone of awareness, even if the occupants of the vehicle have already silenced alarm 217 when the vehicle entered a first zone of awareness. In alternative to completely silencing alarm 217, a system may be provided to quiet alarm 217, i.e. to a reduced volume that is not as distracting. Alternatively, audible alarm 217 may be made less distracting by providing the warning only once, only a limited number of times, repeatedly for only a limited time, or only every so often.

In addition to or instead of audible alarm 217, alerting system 201 according to various embodiments of the present invention, may have a visual indication, which may be displayed on a visual display 220. Visual display 220 may be a screen such as a CRT, an LCD, or may be one or more lights or LEDs. Visual display 220 may be a control display unit with both a screen and a keyboard. The operator may be able to select various displays and perform various functions, in some embodiments, including inputting flight plans. The visual indication of the present invention, for example on visual display 220, may include a designation of a feature located within the zone of awareness. This designation may be similar to that for audible alarm 217 described above. In the exemplary embodiment illustrated in FIG. 1, the designation may be the designation of a runway. For instance, in the embodiment illustrated in FIG. 1, alarm 217 may produce a visual indication such as "RUNWAY", which may remain on visual display 220 as long as the vehicle is within the zone of awareness. Alternatively, a visual indication may include the designation of the zone of awareness or of a feature within the zone of awareness. For instance, in the embodiment illustrated in FIG. 1, the feature may be runway 27, and display 220 may show the designation of the runway. For example, visual display 220 may show an alert such as "RUNWAY 27", which may remain on display 220 as long as the vehicle is within the zone of awareness. Visual display 220 may also show other information, such as with reference to the exemplary embodiment illustrated in FIG. 1, a map of airport 100 showing the location of various features. Such features may include, inter alia, the aircraft itself (e.g. 101), the control tower 151, the terminal 153, taxiways (e.g. 162), and the runways (e.g. 111, 112, and 113).

In the embodiment of the present invention wherein the vehicle is an aircraft and the only purpose of the alerting system is to alert the pilot or flight crew while the aircraft is taxiing on the ground, it may be desirable that the system not alert the pilot or flight crew when the aircraft flies over a zone of awareness. Such systems may have an enablement system 208 configured to enable the alerting system when the aircraft is on the ground. However, it generally is not necessary to have a new or additional sensor for such a system. Rather, such a system may be activated by the aircraft having weight on the wheels (WOW) (e.g. through the Enhanced Ground Proximity Warning System (EGPWS)), by the landing gear being down, or other events or activities that occur when the aircraft is on the ground but usually not when it is in the air. Positioning system 205 may also be used to determine whether aircraft (e.g. 101) is on the ground. Thus, the system will only alert when the aircraft is taxiing, and not while it is flying. On the other hand, in other embodiments it may be desirable to enable an alerting system while an aircraft is in the air, for instance, to notify if an aircraft is about to enter restricted airspace, e.g. over a military base or a hostile country. It may also be desirable to have zones of awareness and the pilot or flight crew alerted when an aircraft flies into mountainous regions, high traffic regions, regions having unusual weather patterns, or regions currently having severe weather warnings. With such embodiments, it may be desirable to have an enabling system 208 that is configured to enable only certain features when the aircraft is on the ground, other features being enabled while the aircraft is in flight.

Referring to the embodiment illustrated in FIG. 1, the alerting system according to the present invention may be used to alert the pilot or flight crew of aircraft 101 that aircraft 101 is or approaching runway 111. However, in the alternative, or in addition, the alerting system may identify the specific runway that the aircraft is on or is approaching. Thus, in some embodiments of the present invention the method of reducing unintentional incursions of aircraft onto runways may provide a method of reducing aircraft accidents and collisions caused by aircraft inadvertently using the wrong runway. For instance, alerting the pilot or flight crew of the designation of the runway that the aircraft is on may prevent an aircraft from using a runway while believing it to be another runway. Such an error could cause tragedy in a situation where the runway that is being used is closed for maintenance or is currently being used by another aircraft. Errors of this type may occur, particularly in poor visibility conditions, such as at night, in poor weather conditions, or both. Such an alert system may be used for aircraft taxiing on the ground, but may also be used for aircraft that are in the air, e.g. for aircraft that are about to land. Such a system may be configured to alert the pilot or flight crew when the aircraft is lined up with a runway and is within a predetermined distance from the runway. The elevation of the aircraft, e.g. relative to the elevation of the runway, and the rate of decent, inter alia, may also be considered, e.g. by processor 211.

Alerting system 201 shown in FIG. 2 is typically located on a vehicle, such as aircraft 101 shown in FIG. 1. Generally each vehicle would have its own alerting system 201. Thus, aircraft 102 would have its own system independent of the system on aircraft 101. The location information for various zones of awareness in storage device 202 may be the same, e.g. originally from the same source, for different vehicles (e.g. aircraft 101 and 102). However, it may be different, for instance, if aircraft 101 and 102 sometimes land at different airports.

In embodiments on aircraft, such as aircraft 101 in FIG. 1, existing systems on the aircraft may provide most of the hardware required. For instance, the FMS may perform the processing, storage, and positioning, the EGPWS may provide the audible alarm, and the CDU may provide the visual display. In some embodiments, only wiring and software changes may be required. For instance, a distance algorithm may be required.

Referring to FIG. 1, in embodiments involving traffic at airports, the alerting system may include a feature or step to notify air traffic controllers, e.g. in the control tower 151, of alerts. For instance, alerts may be communicated to air traffic controllers via radio, such as by telemetry. Such alerts may be presented for air traffic controllers on a display or other device so the air traffic controllers are aware when zones of awareness, such as runway 111, are occupied by vehicles such as aircraft 101. Air traffic controllers may then use this information to make decisions regarding whether other aircraft can land or take off on the runway. In an exemplary embodiment, a system may interface with a CNS/ATM ground mode displayed on the "bright" display console in the ground controller's station in the tower 151. Alternatively, alerts may be broadcast by voice radio or telemetry to alert pilots and flight crew of other aircraft, e.g. of runway incursions. Thus a pilot landing on a particular runway may be able to avoid a runway collision by flying around again when she is alerted that another aircraft has just mistakenly taxied onto the same runway.

FIG. 3 illustrates a method according to the present invention. The method illustrated in FIG. 3 may be used to reduce unintentional incursions of vehicles into zones of awareness. Typically, such a vehicle has human occupants who are alerted e.g. as to potential or imminent incursions. Various embodiments of the method typically include steps 302, 311, 314, 317, and at least one of 326 and 332. Step 302 is to store position information regarding the zones of awareness (ZOA), e.g. in storage device 202 of FIG. 2. In some embodiments, step 302 may be performed relatively infrequently, only as often as necessary to reflect changes in the zones of awareness. In such cases, step 302 may be performed by downloading data into storage device 202, for instance, from a CD, or by reprogramming an EPROM. In these embodiments, step 302 may be performed periodically, as an example, every 28 days. However, in embodiments where the zones of awareness change frequently, step 302 may be performed more often, for instance by receiving an updated database, or changes to the existing database, periodically by telemetry or radio transmission. Step 311 is to determine the position of the vehicle, and is typically performed repeatedly while the system is in operation. Thus, in many embodiments, step 311 is performed many times for each performance of step 302.

Step 314 may be to calculate the distance between the vehicle and the zone of awareness, or between the vehicle and a reference associated with the zone of awareness, such as the line segment described above. Step 317 is to determine if the distance is within predetermined parameters, e.g. within 150 feet. However, the velocity or direction of travel, or both, may be taken into consideration. In other words, an alert may be initiated sooner if the vehicle is traveling toward the zone of awareness at a higher speed. Step 332 is to sound an audible alarm, e.g. to alert the occupants of the vehicle, as described above with reference to alarm 217 in FIG. 2. Step 326 is to display a visual indication, typically also to alert the occupants of the vehicle, as described above with reference to visual display 220 in FIG. 2. Either step 332, step 326, or both, may be included in the method.

In some embodiments the method may include the step 308 of determining whether the vehicle is on the ground. In some such embodiments, steps 311, 314, and 317 are not performed unless the vehicle is on the ground. In other embodiments (not shown) the method would be altered in other ways if the vehicle is not on the ground, some of which are described herein.

In embodiments which have an alarm step 332, there may also be a feature to allow the occupant to acknowledge and silence or quiet the alarm. See as an example, silencing system 214 described above with reference to FIG. 2. In embodiments where the vehicle is an aircraft, the pilot or flight crew may perform the step of getting clearance to enter or cross the zone of awareness prior to quieting the alarm. Typically, the operator will quiet the alarm through a manual act such as by pressing a button or giving a voice command. Some embodiments of the method include step 329 to determine if the alarm has been quieted. Thus, alarm step 332 may take place only if the alarm has not been quieted, as determined in step 329. Some embodiments may also have step 320 to determine if the alarm has been quieted when, as determined in step 317, the distance is not within the predetermined parameters. These embodiments may also have step 323 to reset the quieted alarm where it has been found in step 320 that the alarm has been quieted. In other words, the method may include the step of re-enabling a quieted alarm when or after the distance between the vehicle and the reference exceeds a predetermined value, e.g. 150 feet. Thus, alarm 332 will be operational if the vehicle enters or approaches another zone of awareness.

In some embodiments, the method is used to reduce unintentional incursions of vehicles onto runways. Thus, the zones of awareness typically surround runways, and the method may use the centerlines of the runways as references for establishing the zones of awareness. In an exemplary embodiment, the present invention provides a method of reducing unintentional incursions of taxiing aircraft (e.g. aircraft 101 on FIG. 1) onto runways (e.g. runway 111 on FIG. 1). The aircraft typically has a control system and a pilot or flight crew, and the method typically includes the step 302 of storing within the control system the position of a plurality of runways, step 311 of determining the position of the aircraft, step 314 of calculating the distance between the aircraft and at least one runway, and step 326 or 332 of alerting the pilot or flight crew if said distance is found in step 317 to be within predetermined parameters.

In some embodiments, step 317 may include the steps of repeatedly determining the velocity of the aircraft, repeatedly determining the heading of the aircraft, and adjusting the predetermined parameters or the position of the aircraft based on the velocity and heading of the aircraft. In some embodiments the method may include the step 308 of determining whether the aircraft is on the ground. In some such embodiments, steps 311, 314, and 317 are not performed unless the aircraft is on the ground. In other embodiments (not shown) the method would be altered in other ways if the aircraft is not on the ground, some of which are described herein.

Embodiments of the method according to the present invention that have audible alarm may also include the step of the pilot or flight crew manually acknowledging and quieting the alarm, for example, by pressing a button or giving a voice command. Such embodiments may include the step 323 of resetting or re-enabling a quieted alarm e.g. when or after the distance between the aircraft and the runway exceeds a predetermined value. Such re-enabling of the alarm may be automatic—i.e. not require action on the part of the pilot or flight crew.

Embodiments of the method may also include a step of providing to the occupant the designation of the zone of awareness, or a feature within the zone of awareness, that the vehicle is on, near, or approaching. Thus, the alerting system may alert the occupants of precisely what the vehicle is approaching, so that the occupant can respond accordingly. For instance, embodiments involving aircraft and runways may include a step of providing to the pilot or flight crew the designation of the runway that the aircraft is on or approaching. The system may be configured to provide the designation of the runway when the aircraft is approaching while taxiing on the ground, when it is approaching in the air (e.g. to land on the runway), or both. This step may be performed audibly through step 332, or visually through step 326. When the occupant receives an alert that the vehicle is in or approaching a zone of awareness, the occupant may reevaluate the course of the vehicle. Specifically, the occupant may choose to avoid the zone of awareness, or may take other action or precautions. Typically when a pilot or flight crew receives an alert that the aircraft (e.g. aircraft 101 in FIG. 1) is on or approaching a runway that they did not intend to use, the pilot or flight crew will take appropriate action, including as an example, the step of contacting an air traffic controller for instructions. For instance, a pilot may contact the local controller or ground controller by radio.

Closed Surfaces Advisory Embodiments

As noted above, closed surfaces at an airport may be inadvertently traversed by a landing aircraft or an on-the-ground aircraft. Various embodiments alert an aircraft that is approaching or is in a closed surface of an airport. In particular, closed surfaces at an airport may be inadvertently traversed by a landing aircraft or an on-the-ground aircraft. Non-limiting examples of surface areas are runways, gates, ramps, parking stands, taxiways, aprons, or de-icing areas. Surface areas may be closed because of some physical obstruction ('X' sign) or a surface issue (such as a milled surface being prepared for fresh concrete, or other construction or maintenance issue). In other situations, the on-the-ground aircraft may attempt to enter, or turn onto, a runway, taxiway or other surface for which the aircraft is not cleared to be on by the airport controllers. That is, the aircraft may deviate from its cleared taxiway route or runway. In other situations, an airborne aircraft may be attempting to land on a closed runway. For that particular aircraft, airport surfaces for which the aircraft is not cleared to land is considered a closed surface.

Figure 4:
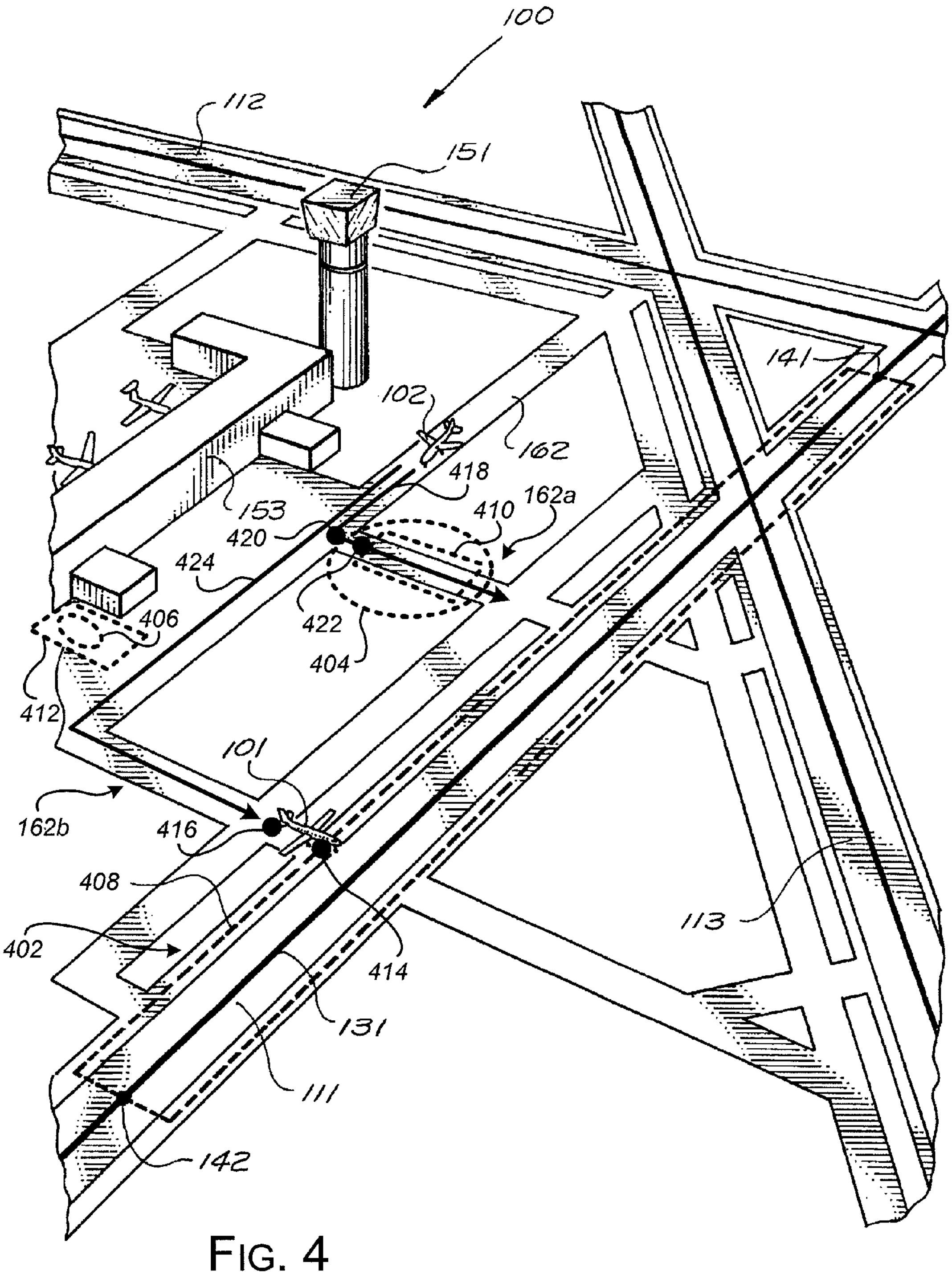
FIG. 4 is an isometric view of the airport with three exemplary closed surfaces.

FIG. 4 is an isometric view of the airport 100 with three exemplary closed surfaces 402, 404, and 406. The closed surface 402, associated with the zone of awareness 408, corresponds to the closed runway 111. The closed surface 404, associated with the zone of awareness 410, corresponds to a closed taxiway 162*a*. The closed surface 406, associated with the zone of awareness 412, corresponds to a closed gate, apron parking stand, and/or ramp of the terminal 153. The closed surfaces 402, 404, and 406 may be closed for a variety of reasons, such as for repair, maintenance, obstructions, damage, or any other reason. The closure of a surface may be permanent or temporary.

Further, a closed surface may be associated with a particular aircraft, and thus, not be closed to other aircraft. For example, an aircraft may be cleared to travel over a particular taxiway, runway, or series of taxiways. Thus, other taxiways and runways are, for that aircraft, closed surfaces. Thus, if there is a taxiway route deviation by the aircraft, suitable alerts may be provided to the crew of the aircraft.

In the illustrative example of FIG. 4, a distance between the current position of the aircraft and the reference point is calculated. In this example, the aircraft 101 is just entering onto the closed surface 402 associated with the zone of awareness 408. That is, the aircraft 101 is entering onto the closed runway 111. An alert reference point 414 is associated with the zone of awareness 408 such that when the aircraft 101 reaches the alert reference point 414, a suitable alert is generated and issued. Accordingly, a position of the exemplary alert reference point 414 is substantially at a border of the zone of awareness 408.

Depending upon the nature of the closure of the runway 111, the pilot and/or crew of the aircraft 101 will receive the warning alert indicating immediate awareness is required and with instructions to take immediate action, such as stopping. In some situations, an alternative alert may instruct the pilot and/or crew of the aircraft 101 to continue to cross over, but not turn onto, the runway 111. Alerts may also provide status information to the crew (as opposed to command type information in the previous examples). For example, an information alert may provide information to the crew that the surface is closed ("runway closed").

In some embodiments, the runway 111 may be known to be the wrong runway for the aircraft 101 to use. Thus, the alert may indicate to the aircraft 101 that the runway 111 should not be used (even if the runway 111 is not actually closed by an obstruction or for maintenance).

In some embodiments, as the aircraft 101 approaches the zone of awareness 408, an audible and/or visual alert will be generated and issued to the pilot and/or crew of the aircraft 101. An alert reference point 416 is associated with the zone of awareness 408 such that when the aircraft 101 reaches the alert reference point 416, an advisory or a caution alert is generated. Accordingly, a position of the alert reference point 416 is at a distance in advance of a border of the zone of awareness 408. The position of the alert reference point 416 may be predefined, or may be based upon the current speed and bearing of the aircraft 101.

In the illustrative example of FIG. 4, the aircraft 102 is traversing the taxiway path 162, which is the cleared or assigned taxiway. If the aircraft 102 travels along a path 418, the aircraft 102 will deviate for its assigned taxiway path 162 and will enter onto the closed taxiway 162*a*. Accordingly, in an exemplary embodiment, as the aircraft 102 is approaching the zone of awareness 410 associated with the closed surface 404, an audible and/or visual alert will be generated and issued to the pilot and/or crew of the aircraft 102. An alert reference point 420 is associated with the zone of awareness 410 such that when the aircraft 102 reaches the alert reference point 420, the alert is generated. Accordingly, a position of the alert reference point 420 is at a distance in advance of a border of the zone of awareness 410. The position of the alert reference point 420 may be predefined, or may be based upon the current speed and bearing of the aircraft 102.

An alert reference point 422 is associated with the zone of awareness 410 such that when the aircraft 102 reaches the alert reference point 422, a warning alert or caution alert is generated and issued. Accordingly, if the aircraft 102 enters the closed surface 404, associated with the zone of awareness 410, the pilot and/or crew of the aircraft 102 will receive a warning alert requiring immediate awareness and to take immediate action, such as stopping. That is, the aircraft 102 will be advised not to enter onto the closed taxiway 162*a*. A position of the alert reference point 422 is substantially at a border of the zone of awareness 410.

On the other hand, if the aircraft 102 is travelling along path 424 to the taxiway 162*b*, the above-described alert associated with the alert reference point 420 may be optionally generated and issued to the pilot and/or crew of the aircraft 102 so that they are aware of the closure of the taxiway 162*a*.

In some embodiments, the alert may be suppressed, or not generated, by the alerting system 201 to reduce nuisance alerts. For example, the alert may be suppressed until the aircraft begins to turn onto the closed surface 404. In some embodiments, the alert (depending upon the alert level) may be manually suppressed by pilot and/or crew of the aircraft 102.

In some situations, the taxiway 162*a* may be a closed surface to aircraft 102, and may not be closed to other aircraft (not shown). For example, the taxiway 162*a* may be too narrow for the aircraft 102, but sufficiently wide for smaller aircraft to use. Thus, the alert may be issued to the aircraft 102, but not to other aircraft.

In the illustrative example of FIG. 4, the aircraft 102 may be traversing the taxiway 162 to go to the gate 406, which is closed. Accordingly, in an exemplary embodiment, as the aircraft 102 is approaching the zone of awareness 412 associated with the closed gate 406, an audible and/or visual alert will be generated and issued to the pilot and/or crew of the aircraft 102. Alert reference points and/or alert reference points (not shown) may be defined such that an alert is generated. The location of alert reference points may be predefined, or may be based upon the current speed and bearing of the aircraft 102.

Figure 5:
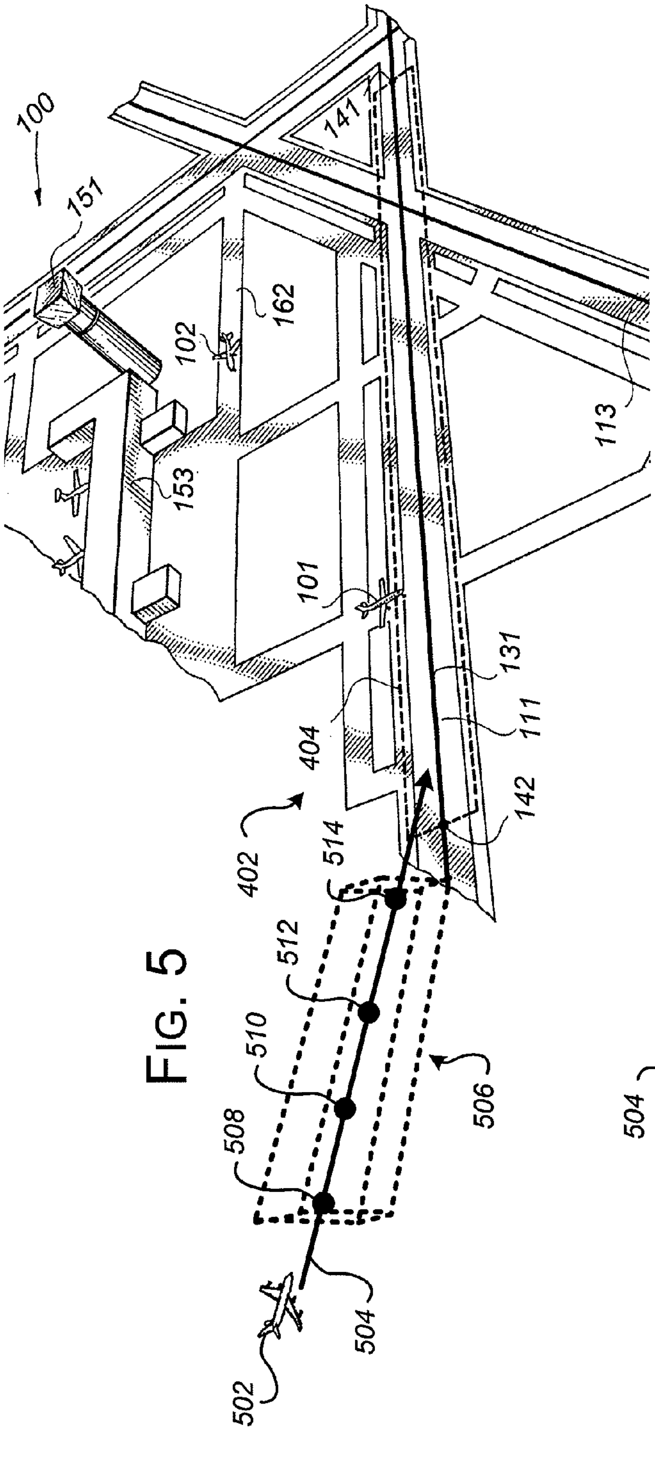
FIG. 5 is an isometric view of the airport with the exemplary closed surface associated with the zone of awareness.
Figure 6:
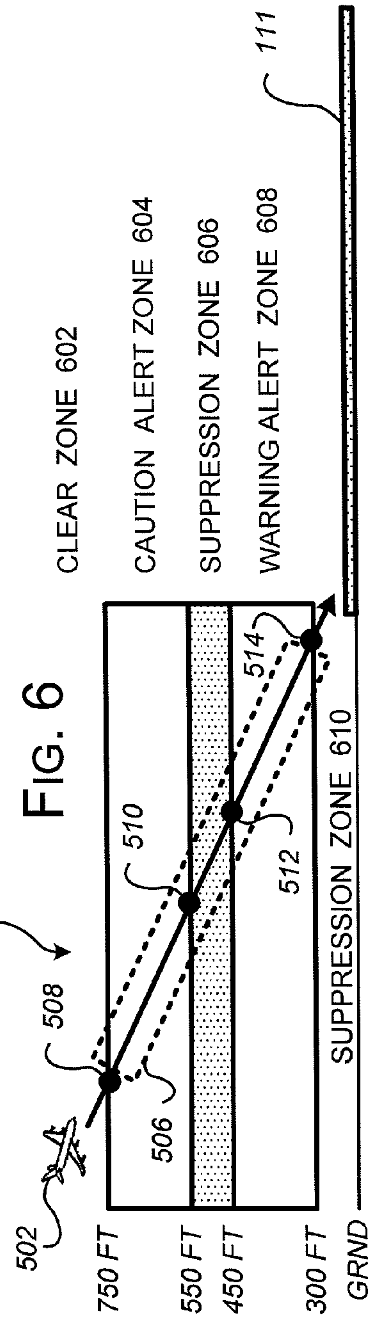
FIG. 6 is a profile view of an airborne aircraft travelling along a path of flight.

FIG. 5 is an isometric view of the airport 100 with the exemplary closed surface 402 associated with the zone of awareness 404. FIG. 6 is a profile view of an airborne aircraft 502 travelling along path of flight 504.

Here, an airborne aircraft 502 is approaching the runway 111 for landing, as denoted by the path of flight 504. However, the runway 111 is a closed surface 404 (or it may be a runway which is not to be used by the aircraft 502, such as when the runway 111 is not an air traffic control cleared runway). Accordingly, a zone of awareness 506 is defined about the flight path 504 since the airborne aircraft 502 should not land on the runway 111. In this example, the zone of awareness 506 is a three dimensional (3-D) rectangular volume, or tunnel, about the path of flight 504. Any suitable 3-D volume may be defined. For example, the zone of awareness 506 may have its lateral extents and or vertical extents adjusted based upon the distance out from the runway centerline 131 and/or from the distance from the runway 111. The zone of awareness 506 may be segmented into several portions with specific dimensions. In some embodiments, the zone of awareness 506 may be funnel shaped or tubular shaped.

Space below the aircraft is divided into five zones, as illustrated in FIG. 6. The clear zone 602 is a region of space, here above 750 feet above field elevation, wherein the alerting system 201 will not generate and issue alerts. The caution zone 604, here between 750 feet and 550 feet above field elevation, is a region of space wherein the alerting system 201 will generate and issue an alert if it is determined that the aircraft 502 is attempting to land on the closed runway 111. In some embodiments, an information alert, an advisory alert, or a caution alert may be generated and issued to the crew of the aircraft 502.

The first suppression zone 606, here between 750 feet and 550 feet above field elevation, is a region of space wherein the alerting system 201 will be suppressed so that alerts are not generated and issued. The warning alert zone 608, here between 450 feet and 300 feet above field elevation, is a region of space wherein the alerting system 201 will generate and issue a warning alert. The second suppression zone 610, here below 300 feet, is a region of space wherein the alerting system 201 will be suppressed. The suppression zones 606 and/or 610 may be optional.

It is assumed that when the aircraft 502 is in the first suppression zone 606, the pilot and/or crew of the aircraft 502 are busy with other matters and should not be disturbed with either a visual and/or an audible alert. Similarly, it is assumed that when the aircraft 502 is in the second suppression zone 610, the pilot and crew of the aircraft 502 are busy with the imminent landing of the aircraft (or evasive maneuvers), and accordingly, should not be disturbed with a visual and/or an audible alert.

In this example, when the aircraft 502 is at or near the alert reference point 508, a cautionary alert is generated and issued. When the aircraft is at or near the alert suppression point 510, alerts become suppressed. When the aircraft 502 is at or near the alert reference point 512, a warning alert is generated and issued. When the aircraft is at or near the alert suppression point 514, alerts become suppressed. Depending upon the embodiment, an alert may be visual only, audible only, or a combination of both. Further, in the suppression zones 606, 610, audible alerts may be suppressed while the visual alerts are continued to be displayed in some manner.

Figure 7:
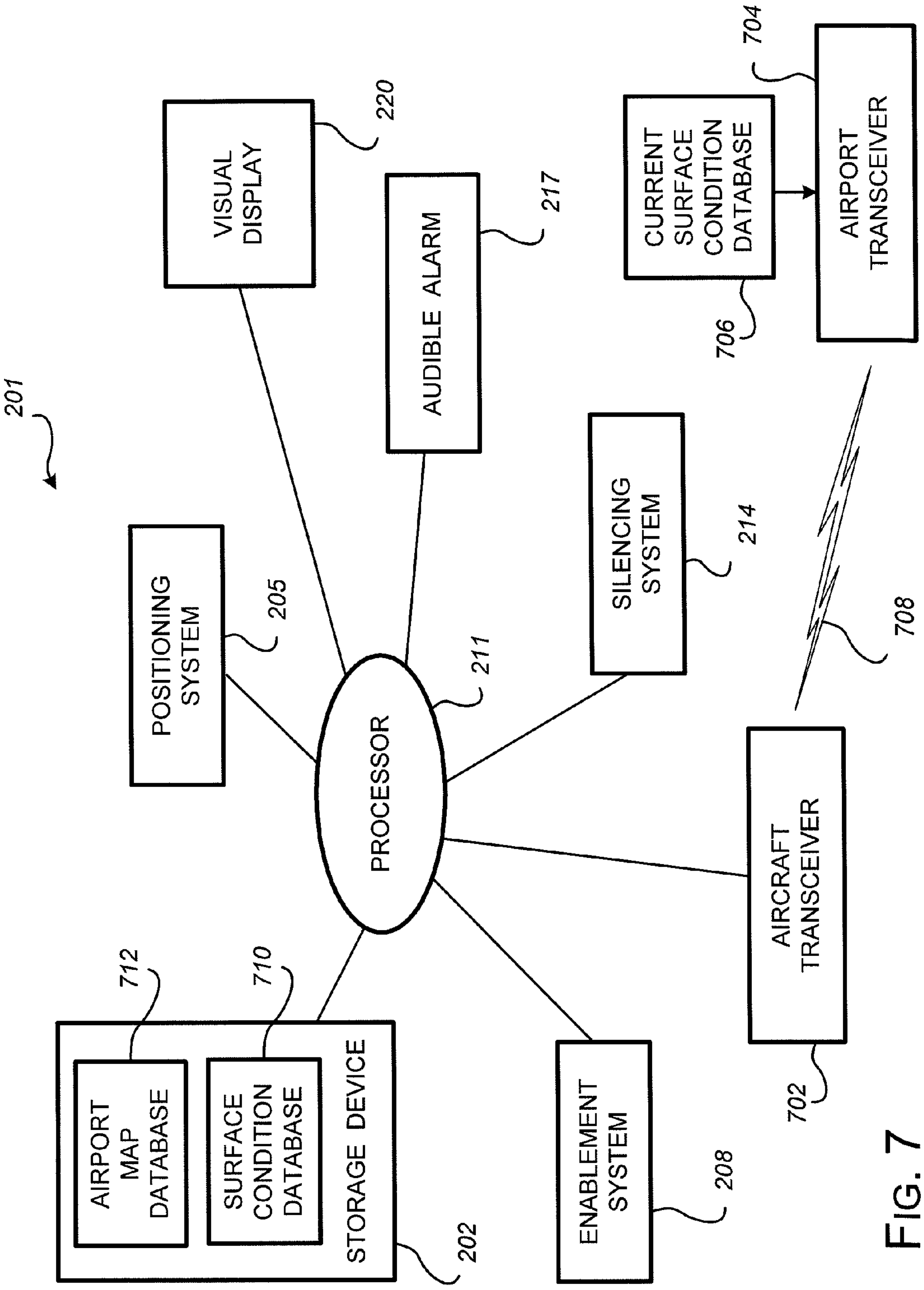
FIG. 7 is an embodiment of the alerting system comprising an aircraft transceiver that is configured to receive information pertaining to current surface conditions at the airport.

FIG. 7 is an embodiment of the alerting system 201 comprising an aircraft transceiver 702 that is configured to receive information pertaining to current surface conditions at the airport 100. Accordingly, a transceiver 704 at the airport 100 accesses current surface condition information from a current surface condition database 706. The transceiver 704 transmits the retrieved information to the transceiver 702 in the aircraft 502, via a suitable wireless signal 708. The received current surface condition information may be stored into a current surface condition database 710 in the memory 202. Further residing in the memory 202 is an airport map database 712 with information for identifying and mapping surfaces at various airports. In some embodiments, surface condition information for various surfaces of the airports may be included in the airport map database 712. In some embodiments, the current surface condition data base 710 and the airport map database 712 are integrated into a common database. In some embodiments, the airport map database 712 resides external to the aircraft, such as at the airport, and is uplinked to the aircraft.

The airport map database 712 has mapping information for a plurality of different airports. When the aircraft is approaching the airport 100, or is moving about the airport 100, mapping information for the airport 100 is retrieved by processor 211.

The positioning system 205 determines the current location of the aircraft on a real time, or near real time, basis. Processor 211 correlates the location of the aircraft, as determined by the positioning system 205, with the map information for the airport 100. A moving map is generated and then displayed by the visible display 220. As the aircraft is moving in proximity to, or is moving about, the airport 100, the displayed moving map is updated so that the aircraft's current position on the displayed moving map of the airport surfaces is accurately represented.

Typically, the airport map database 712 is periodically updated. The updates may also identify surfaces at the airport 100 which are closed. However, the information residing in the airport map database 712 may not be current since airport surfaces may be closed on short notice. Thus, the received current surface condition information may be used to ensure that the aircraft has access to the most currently available and accurate information regarding surface conditions at the airport 100.

Information pertaining to any closed surfaces at the airport 100 is used to define relevant zones of awareness. The current location of the aircraft is continually monitored with respect to the various zones of awareness that are defined for closed surfaces. Thus, if the aircraft encroaches near a closed surface, and/or enters onto a closed surface, an appropriate alert is generated. The alert is then issued to the pilot and/or crew of the aircraft.

The moving map on the display indicates closed surfaces at the airport. For example, an alert for a closed surface may be indicated by shading with a noticeable color, such as yellow or red, and/or by shading with a noticeable fill pattern. For example, a closed taxiway may be indicated with a series of bright yellow "x"s over the taxiway. The cleared taxiway route may be indicted in a different graphical manner, such as by a magenta colored line overlaying the moving map display. The corrected cleared taxi route following a deviation from the initially assigned taxi route may be indicated by a green dotted line. Additionally, or alternatively, alerts may be indicated using suitable text messages presented on the display.

The historical path of travel of the aircraft over the airport surfaces may also be indicated on the moving map. For example, during a particularly foggy time with low ground visibility, the crew may view the historical path of travel of their aircraft so that they can better appreciate where they currently are on the airport taxiways. Here, a dashed colored line or the like may indicate the historical path of travel on the moving map display.

Alerts may be graphically presented to the pilot and/or crew of the aircraft on the displayed moving map. For example, returning to FIG. 4, if the aircraft 102 travels along the path 418, the aircraft 102 will enter onto the closed taxiway 162*a*. Accordingly, such a path may be indicated in a manner that is perceptible to the pilot and/or crew of the aircraft 102, such as by using a bright visible color or other suitable indicator. For example, the path 418, or a portion thereof, may be indicated via a bright red line on the displayed moving map.

Additionally, or alternatively, a suitable textual message may be generated and presented on the visual display 220. In an exemplary embodiment, the textual message is presented on the displayed moving map. Any suitable manner of displaying a textual alert on the visual display 220 may be used. For example, but not limited to, a textual message (for a warning alert) may be "STOP, runway ABC closed" or (for an caution alert) "CAUTION, runway ABC closed" may be shown on the visual display 220. In some embodiments, the textual message may be emphasized with a suitable color, fill pattern, and/or intensity. Any suitable textual message may be used.

Furthermore, closed surfaces themselves may be indicated on the displayed moving map using a suitable identifier. For example, a closed surface area may be highlighted with a noticeable color, fill pattern, and/or intensity so that the pilot and/or crew of the aircraft, when viewing the displayed moving map, readily notices any closed surfaces.

In some embodiments, as noted above, a cleared taxiway route may be indicated on the displayed moving map. For example, if the aircraft 102 is travelling along the taxiway 162 towards the runway 111 or runway 113, the path 424 to the open taxiway 162*b* may be indicated. For example, the path 424 may be shown as a green line on the displayed moving map. In some embodiments, after an incorrect taxiway path has been taken, a new updated cleared taxiway route for the aircraft may be identified and displayed on the moving map.

Audible alerts (aural alerts) may also be generated and issued to the pilot and/or crew of the aircraft. An audible alert may be broadcast out to the pilot and/or crew of the aircraft from the audible alarm 217. Any suitable tone or audible signal may be used. In some embodiments, a verbal audible alert is issued which verbally describes the nature of the situation, such as (for a warning alert) "STOP, runway ABC closed" or (for an alert) "CAUTION, runway ABC closed" by the audible alarm 217. Any suitable verbal message may be used.

Some embodiments may be configured to allow the pilot or crew of the aircraft to input information into the current surface condition database 710 and/or the airport map database 712. For example, the pilot and/or crew of the aircraft may observe during a landing and the subsequent taxiing to the gate that a particular runway, taxiway or other surface is closed. Accordingly, the status of the runway, taxiway or other surface may be changed to indicate that it is closed. When the aircraft leaves the gate and taxies to the designated runway to take off, any encroachments near to or on the closed runway, taxiway and/or other surface will result in an alert.

Other embodiments may be implemented in other types of vehicles. For example, the vehicle may be an automobile, the surfaces over which the vehicle may traverse may be a plurality of roads, and various roads or road surfaces may be closed for any of the reasons described herein. Here, the moving map may be displayed on a GPS display or a display built into the vehicle.

In the foregoing specification, the invention has been described with reference to specific exemplary embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. In addition, benefits, other advantages, and solutions to problems have been described above with regard to specific embodiments. However, the benefits, advantages, solutions to problems, and any elements(s) what may cause any benefit, advantage, or solution to occur or become more pronounced are not to be construed as a critical, required, or essential feature or element of any or all the claims. As used herein, the terms "comprises", "comprising", or any other variation thereof are intended to cover non-exclusive inclusion, such that a process, method, article, or apparatus that comprises a list of elements does not include only those elements but may include other elements not expressly listed or inherent to such process, method, article, or apparatus.

The embodiments of the invention in which an exclusive property or privilege is claimed are defined as follows:

1. A method of reducing unintentional incursions of an aircraft into zones of awareness associated with surfaces at an airport, the method comprising:

retrieving a position of a reference point associated with a zone of awareness, the zone of awareness corresponding to a closed surface of the airport;

determining a current position of the aircraft;

calculating a distance between the current position of the aircraft and the reference point; and generating and issuing an alert in response to the current position of the aircraft corresponding to the position of the reference point.

2. The method of claim 1, further comprising:

defining the reference point for the zone of awareness, wherein the zone of awareness corresponds to at least one selected from a group consisting of a closed taxiway, a wrong taxiway, a closed apron, a closed gate, a closed parking stand, a closed ramp, a closed de-icing area, and a closed runway at the airport.

3. The method of claim 1, further comprising:

receiving information defining a cleared taxiway route from an air traffic control facility, the cleared taxiway route identified by at least one of a cleared taxiway and a cleared runway;

defining remaining taxiways and runways at the airport as closed surfaces;

displaying the cleared taxiway route using a first indicia on a moving map of the airport surfaces; and displaying the closed surfaces using a second indicia on the moving map of the airport surfaces.

4. The method of claim 3, further comprising:

tracking the current position of the aircraft with a location of the at least one cleared taxiway route; and generating an alert in response to the aircraft deviating from the cleared taxiway route.

5. The method of claim 4, wherein the cleared taxiway route is an original cleared taxiway route, and further comprising:

defining a new cleared taxiway route in response to the deviation of the aircraft from the original cleared taxiway route;

displaying the new cleared taxiway route on the moving map.

6. The method of claim 3, further comprising:

displaying a historical traveled route on the moving map indicating previous travel of the aircraft over the cleared taxiway route.

7. The method of claim 1, further comprising:

receiving information pertaining to current surface conditions at the airport, wherein the received information pertaining to the current surface conditions at the airport is received from a transceiver at the airport.

8. The method of claim 1, further comprising:

receiving information pertaining to current surface conditions at the airport, wherein the received information pertaining to the current surface conditions at the airport is received from at least one of a pilot and a crew of the aircraft.

9. The method of claim 1, further comprising:

defining a position of an alert reference point for the zone of awareness, wherein the position of the alert reference point is substantially at a border of the zone of awareness; and generating and issuing a warning alert in response to the current position of the aircraft corresponding to the position of the alert reference point.

10. The method of claim 9, wherein the aircraft is landing, wherein the zone of awareness corresponds to a closed runway, and wherein the position of the alert reference point is at a predefined altitude.

11. The method of claim 1, further comprising:

defining a position of an alert reference point for the zone of awareness, wherein the position of the alert reference point is at a distance in advance of a border of the zone of awareness; and generating and issuing a caution alert in response to the current position of the aircraft corresponding to the position of the alert reference point.

12. The method of claim 11, wherein the position of the alert reference point is at a predefined distance in advance of the border of the zone of awareness.

13. The method of claim 11, wherein defining the position of the alert reference point is defined based upon a speed and a bearing of the aircraft.

14. The method of claim 11, wherein the aircraft is landing and wherein the zone of awareness corresponds to a closed runway, and wherein the position of the alert reference point is at a predefined altitude.

15. The method of claim 1, wherein generating and issuing the alert comprises:

generating and issuing one of an audible alert.

16. The method of claim 1, wherein generating and issuing the alert comprises:

generating and issuing at least one of a textual alert and a graphical alert; and displaying the at least one of the textual alert and the graphical alert on a displayed moving map of the airport.

17. An alerting system for alerting an occupant of an aircraft on the ground that the aircraft is in or approaching a zone of awareness, comprising:

a storage device located on the aircraft, the storage device configured to store location information for a plurality of zones of awareness corresponding to closed surfaces at the airport, a map of the airport, and a position of at least one reference point for each of the plurality of zones of awareness;

a positioning system located on the aircraft, the positioning system being configured to determine a current location of the aircraft;

an alerting device located on the aircraft, the alerting device configured to issue an alert; and a processor located on the aircraft, the processor configured to calculate a distance between the current location of the aircraft and the at least one reference point, and configured to generate the alert in response to the current location of the aircraft corresponding to the position of the at least one reference point.

18. The alerting system of claim 17, further comprising:

a transceiver located on the aircraft, the transceiver configured to receive from a transceiver at the airport information pertaining to current surface conditions at the airport.

19. The alerting system of claim 17, wherein the processor is further configured to define a position of an alert reference point for a zone of awareness substantially at a border of the zone of awareness, wherein the alert is generated and issued in response to the current location of the aircraft corresponding to the position of the alert reference point.

20. The alerting system of claim 17, wherein the processor is further configured to define a position of an alert reference point for the zone of awareness at a distance in advance of a border of the zone of awareness, wherein the alert is generated and issued in response to the current location of the aircraft corresponding to the position of the alert reference point.

21. An alerting system for alerting an occupant of an aircraft on the ground that the aircraft is in or approaching a zone of awareness, comprising:

means for retrieving a position of a reference point associated with a zone of awareness, the zone of awareness corresponding to a closed surface of the airport;

means for determining a current position of the aircraft;

means for calculating a distance between the current position of the aircraft and the reference point; and means for generating and issuing an alert in response to the current position of the aircraft corresponding to the position of the reference point.

22. A method of reducing an unintentional incursion of a vehicle into a zone of awareness associated with surfaces over which the vehicle may traverse, the method comprising:

retrieving a position of a reference point associated with the zone of awareness, the zone of awareness corresponding to a closed surface over which the vehicle should not traverse;

determining a current position of the aircraft;

calculating a distance between the current position of the vehicle and the reference point; and generating and issuing an alert in response to the current position of the vehicle corresponding to the position of the reference point.

* * * * *